No. 768,292. PATENTED AUG. 23, 1904.
G. J. MILLER.
ANIMAL TRAP.
APPLICATION FILED APR. 1, 1904.
NO MODEL.
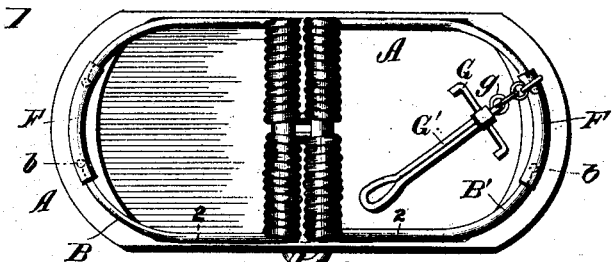
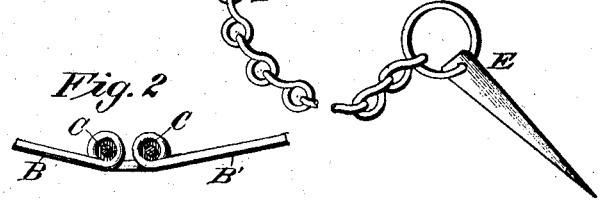
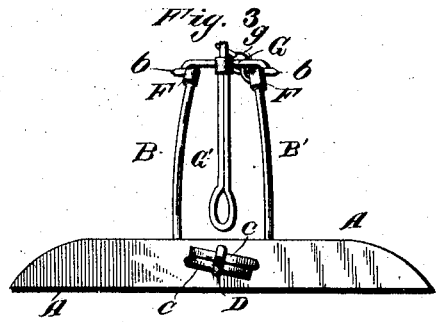
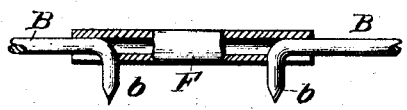
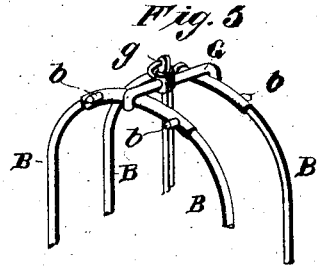
WITNESSES:
C. Edward Duffey
Amos W. Hart
INVENTOR
George J. Miller
BY Munn & Co.
ATTORNEYS No. 768,292. Patented August 23, 1904.

UNITED STATES PATENT OFFICE.

GEORGE JOSIPH MILLER, OF WALLA WALLA, WASHINGTON.

ANIMAL-TRAP.

SPECIFICATION forming part of Letters Patent No. 768,292, dated August 23, 1904.

Application filed April 1, 1904. Serial No. 201,184. (No model.)

*To all whom it may concern:*

Be it known that I, GEORGE JOSIPH MILLER, a citizen of the United States, residing at Walla Walla, (post-office box 520,) in the county of Wallawalla and State of Washington, have invented a new Animal-Trap, of which the following is a description.

My invention is an improvement in that class of animal-traps in which a spring-actuated bow-shaped jaw is adapted to be set and locked in a retracted position and when tripped by the animal snaps down upon his body.

The invention relates particularly to the construction of the locking and tripping device and its connection with the spring-jaws; also to the construction of the spring-jaws and their attachment to fixed portions of the stationary frame, which portions constitute their fulcra; also the means for connecting the ends of the wires forming each of the spring-jaws.

The details of construction, arrangement, and operation of parts are as hereinafter described, reference being had to the accompanying drawings, in which—

Figure 1 is a plan view of my improved trap. Fig. 2 is a transverse section on the line 2 2 of Fig. 1. Fig. 3 is a side view of the trap, the spring-jaws being retracted and locked by the tripping device. Fig. 4 is a detail partly sectional view illustrating the connection between the ends of the wires forming a jaw. Fig. 5 is a perspective view further illustrating the means and manner of locking the jaws ready for tripping.

The body of the trap is a horizontal frame A, preferably constructed of metal and having rounded ends which are sloped on the upper side.

B B' indicate the respective bow-shape spring-jaws, which are formed and attached as follows: Two rods or shafts C extend between the sides of the frame transversely, as indicated in Figs. 1 and 2, the same being arranged practically in the center of the frame A. These rods are riveted at one end and are curved at their opposite ends, as indicated in Figs. 1 and 3, the ends *c* overlapping each other, as shown, and thus forming a loop, to which an anchoring-chain D, provided with a spike E, is secured. One-half of each of the two jaws B and B' is formed by a single wire, which is coiled in opposite directions around the two adjacent rods or shafts C, the two end portions of the wire being extended along the side of the frame A and each curved inward to its extremity, where it is bent downward and pointed to form a fang or piercing-point *b*. (See Fig. 4.) The ends of the wires forming each of the jaws B and B' are connected by a tube F, as shown best in Figs. 4 and 5. The tube is slotted for a short distance at either end, the slot being of sufficient width to receive a fang *b*. After the wires have been duly inserted in the slots the ends of the tube are compressed in order to clamp them tightly upon the wires and their fangs, as will be apparent without further description. Thus the tubes F form a rigid connection for the members of the jaw.

The device for locking the jaws when retracted or set, as indicated in Figs. 3 and 5, consists of a catch G, having curved ends adapted to partly embrace the tubes F, and a bar G', which is rigidly attached to and when in normal position is pendent from the bar G. To this pendent bar the bait for luring the animal is attached. The device G G' is permanently but loosely attached to the jaw B' by means of a short chain *g*.

It is obvious that to set the jaws B B' it is only necessary to raise their free ends and bring the jaws to the vertical position indicated in Fig. 3, when the locking device may be slipped into engagement with the tubes F, and thus practically with the jaws proper, as indicated both in Figs. 3 and 5. It is obvious that when the animal seizes the bait a slight movement of the pendent bar G' will serve to release the catch G from the jaws or from the tubes F, forming a part thereof, whereupon the jaws snap down with great velocity and force and strike upon the body of the animal, which is thus clamped between the jaw and the sloping portion of the frame A, which the jaw overhangs, as shown in Fig. 1.

What I claim is—

1. In an animal-trap of the class indicated, the combination, with the horizontal base-frame having transverse parallel shafts, of spring-jaws formed of wires which are coiled in opposite directions around said shafts, and their ends extended to form the free portions of the jaws, substantially as described.

2. In an animal-trap of the class indicated, the combination, with a horizontal base-frame having parallel shafts arranged transversely at its middle, spring-jaws formed of spring-wire coiled around the said shafts in opposite directions, the free ends of the wires being extended and curved and provided with fangs, and tubes connecting such ends, substantially as described.

3. In an animal-trap, the combination, with a spring-jaw formed of spring-wire coiled about a shaft and having ends extended and curved toward each other, and a tube applied for connecting said ends upon which the tube is pressed, substantially as described.

4. In an animal-trap, the combination, with a base-frame and a spring-jaw whose opposite ends are curved to form fangs, and a tube connecting such ends and provided at its ends with lengthwise slots adapted to receive the fangs, the slotted portions of the tubes being compressed upon the wires substantially as described.

5. In an animal-trap, the combination, with the base-frame having transverse shafts, and spring-jaws formed of spring-wire coiled about the shafts, their ends being connected, of a trip comprising a head having curved ends adapted to partly embrace the jaws, and a pendent bar to which the bait may be attached, substantially as described.

6. In an animal-trap, the combination, with the horizontal base having an end portion which is sloped as indicated, of a spring-jaw whose free end is extended beyond the upper edge of the sloping portion of the frame, so that the jaw will snap down thereon, substantially as described.

7. An animal-trap comprising a base-frame having a transverse shaft whose end is curved to form a loop exterior to the frame, and an anchoring-chain attached to such loop, substantially as described.

In testimony whereof I have signed my name to this specification in the presence of two witnesses.

GEORGE JOSIPH MILLER.

Witnesses:
   E. W. POMEROY,
   D. H. WOOLERY.